(12) United States Patent
Searcy et al.

(10) Patent No.: US 10,090,917 B2
(45) Date of Patent: Oct. 2, 2018

(54) METHOD AND APPARATUS FOR AUTOMATIC DETERMINATION OF A FIBER TYPE

(71) Applicant: ADVA Optical Networking SE, Meiningen (DE)

(72) Inventors: Steven Searcy, Atlanta, GA (US); Sorin Tibuleac, Johns Creek, GA (US)

(73) Assignee: ADVA OPTICAL NETWORKING SE, Meiningen-Dreissigacker (DE)

( * ) Notice: Subject to any disclaimer, the term of this patent is extended or adjusted under 35 U.S.C. 154(b) by 21 days.

(21) Appl. No.: 15/203,078

(22) Filed: Jul. 6, 2016

(65) Prior Publication Data

US 2018/0013490 A1 Jan. 11, 2018

(51) Int. Cl.
| | |
|---|---|
| G01N 21/00 | (2006.01) |
| H04B 10/079 | (2013.01) |
| G02B 6/42 | (2006.01) |
| G01M 11/08 | (2006.01) |
| G01M 11/00 | (2006.01) |

(52) U.S. Cl.
CPC ......... *H04B 10/079* (2013.01); *G01M 11/088* (2013.01); *G01M 11/30* (2013.01); *G02B 6/422* (2013.01)

(58) Field of Classification Search
CPC ........... G01M 11/3145; G01M 11/335; G01M 11/33; G01M 11/3109; G01M 11/338
USPC ........................................................ 356/73.1
See application file for complete search history.

(56) References Cited

U.S. PATENT DOCUMENTS

| | | |
|---|---|---|
| 6,275,313 B1 | 8/2001 | Denkin et al. |
| 6,687,426 B1 | 2/2004 | May et al. |
| 7,081,988 B2 | 7/2006 | Charlet et al. |
| 7,088,436 B2 | 8/2006 | Saunders et al. |
| 7,224,514 B2 | 5/2007 | Peeters et al. |
| 7,382,525 B2 | 6/2008 | Charlet et al. |
| 7,460,297 B2 | 12/2008 | Eiselt |
| 7,808,623 B2 | 10/2010 | Piciaccia et al. |
| 8,306,420 B2 | 11/2012 | Conklin et al. |
| 8,554,088 B2 | 10/2013 | Goto |

(Continued)

FOREIGN PATENT DOCUMENTS

| | | |
|---|---|---|
| GB | 2460483 A | 12/2009 |
| WO | WO 2015/116817 A1 | 8/2015 |

OTHER PUBLICATIONS

Krummrich P.M,. "Raman Impairments in WDM Systems," Chapter 16, Raman Amplifiers for Telecommunications 2: Sub-Systems and Systems p. 569 (2004).

(Continued)

*Primary Examiner* — Md M Rahman
(74) *Attorney, Agent, or Firm* — Jenkins, Wilson, Taylor & Hunt, P.A.

(57) ABSTRACT

A method and apparatus for automatic determination of a fiber type of at least one optical fiber span used in a link of an optical network, the method comprising the steps of measuring a length of said optical fiber span; measuring a chromatic dispersion of said optical fiber span; determining a fiber dispersion profile of said optical fiber span on the basis of the measured length and the measured fiber chromatic dispersion; and determining a fiber category and/or a specific fiber type of said optical fiber span depending on the determined fiber dispersion profile.

23 Claims, 4 Drawing Sheets

(56) References Cited

U.S. PATENT DOCUMENTS

| | | | | |
|---|---|---|---|---|
| 2002/0145729 A1* | 10/2002 | Reepschlager | ........ | H04B 10/07 356/73.1 |
| 2003/0200296 A1* | 10/2003 | Lindsey | .............. | H04L 41/5054 709/223 |
| 2008/0063408 A1* | 3/2008 | Pape | .................... | G01M 11/333 398/141 |
| 2015/0117853 A1* | 4/2015 | Zhang | ................ | H04B 10/0795 398/20 |
| 2016/0197673 A1* | 7/2016 | McClean | ......... | H04B 10/07955 398/38 |

OTHER PUBLICATIONS

Communication of the extended European search report for European Application No. 16206696.3 (dated Jul. 25, 2017).
Baker et al., "Chromatic-dispersion measurement by modulation phase-shift method using a Kerr phase-interrogator," Optical Express, vol. 22, No. 19, pp. 22314-22319 (Sep. 22, 2014).

\* cited by examiner

METHOD AND APPARATUS FOR AUTOMATIC DETERMINATION OF A FIBER TYPE

FIELD OF THE INVENTION

The invention relates to a method and apparatus for automatic determination of a fiber type of an optical fiber span used in an optical network.

TECHNICAL BACKGROUND

Optical networks comprise a plurality of optical network nodes which are connected to each other through optical fiber spans. Each optical fiber span can comprise at least one optical fiber through which an optical signal is transmitted from a transmitting network node to a receiving network node. The fibers used in an optical fiber span can comprise different optical fiber types. A wide variety of optical fiber types have been deployed in optical networks around the world over the past several decades. Different fiber manufacturers produce optical fibers with different characteristics. Further, each fiber manufacturer does develop different fiber designs over time. The resulting diversity of single-mode fiber types deployed over the recent years in optical networks led to the situation where many network operators of optical networks have only a limited access, knowledge or records about existing fibers, particularly if the fibers have been purchased or leased from third parties. The various deployed fiber types have quite a broad range of different fiber characteristics providing different transmission performance and impairments on optical signals propagating over the optical fibers. A fiber type of an optical fiber comprises key optical characteristics within a range of values which determine a specific range of performance of the optical network system, or require a specific parameter setting in the optical system. Because of the limited access, knowledge and/or records of existing or deployed optical fibers in an optical network there is a need to provide a method and apparatus for determination of the fiber types of optical fibers of an optical network.

SUMMARY OF THE INVENTION

The invention provides according to a first aspect a method for automatic determination of a fiber type of at least one optical fiber span used in a link of an optical network, the method comprising the steps of:
measuring a length of said optical fiber span;
measuring a chromatic dispersion of said optical fiber span;
determining a fiber dispersion profile of said optical fiber span on the basis of the measured length and the measured fiber chromatic dispersion; and
determining a fiber category and/or a specific fiber type of said optical fiber span depending on the determined fiber dispersion profile.

In a possible embodiment of the method according to the first aspect of the present invention, the fiber chromatic dispersion of said optical fiber span is measured for at least one signal wavelength of a signal transmitted through said optical fiber span within a predetermined signal transmission band.

In a further possible embodiment of the method according to the first aspect of the present invention, the fiber chromatic dispersion of the optical fiber span is measured for multiple signal wavelengths of signals transmitted through said optical fiber span inside or outside a predetermined signal transmission band.

In a still further possible embodiment of the method according to the first aspect of the present invention, for each signal wavelength a dispersion coefficient is determined on the basis of the measured fiber length and on the basis of the measured chromatic dispersion of said optical fiber span.

In a still further possible embodiment of the method according to the first aspect of the present invention, if the fiber chromatic dispersion of the optical fiber span is measured for multiple signal wavelengths a corresponding number of dispersion coefficients is determined and the determined dispersion coefficients are evaluated to derive a chromatic dispersion slope of the optical fiber span.

In a still further possible embodiment of the method according to the first aspect of the present invention, the fiber category and/or fiber type of said optical fiber span is determined depending on the fiber dispersion profile and/or the derived chromatic dispersion slope.

In a further possible embodiment of the method according to the first aspect of the present invention, the fiber dispersion profile is matched to a fiber type entry of a look-up table to determine a fiber category and/or a specific fiber type of the optical fiber span.

In a further possible embodiment of the method according to the first aspect of the present invention the link is an optical link comprising a single span optical link or a multi-span optical link.

In a further possible embodiment of the method according to the first aspect of the present invention, the single-span optical link comprises a single optical fiber span connecting a network node of the optical network with an adjacent network node of said optical network,
wherein a fiber category and/or a fiber type of the optical fiber span of said single-span optical link is automatically determined by the respective network node of said optical network.

In a still further possible embodiment of the method according to the first aspect of the present invention, at least one parameter of a network node of said optical network connected via a optical fiber span of said optical link to an adjacent network node of said optical network is automatically configured and/or reconfigured on the basis of the determined fiber category and/or fiber type of the respective optical fiber span.

In a still further possible embodiment of the method according to the first aspect of the present invention, a parameter setting of at least one parameter of said network node is calculated depending on the determined fiber category and/or determined fiber type of the respective optical fiber span and applied to optimize a transmission performance of said optical network.

In a further possible embodiment of the method according to the first aspect of the present invention, the parameter comprises an amplifier gain of an amplifier of said network node, and/or a tilt compensation for fiber attenuation tilt and/or stimulated Raman scattering induced tilt.

In a further possible embodiment of the method according to the first aspect of the present invention, a network fiber inventory record of the optical network is generated and/or updated on the basis of the determined fiber categories and/or fiber types of the optical fiber spans provided in said optical network.

In a still further possible embodiment of the method according to the first aspect of the present invention, the fiber chromatic dispersion of said optical fiber span is measured for a single signal wavelength of a signal transmitted through said optical fiber span to determine a fiber category comprising a group of different fiber types.

In a still further possible embodiment of the method according to the first aspect of the present invention, the signal wavelength of the signal transmitted through said optical fiber span is changed and the fiber chromatic dispersion of said optical fiber span for the changed signal wavelength is measured to determine a specific fiber type within the determined fiber category.

In a still further possible embodiment of the method according to the first aspect of the present invention, the link of the optical network is a multi-span optical link which comprises several optical fiber spans forming a signal path connecting two terminal network nodes of said optical network with each other,
wherein an end-to-end length and an end-to-end dispersion of the optical fiber spans of said multi-span optical link is measured to determine a fiber dispersion profile of the optical fiber spans of said multi-span link on the basis of the measured end-to-end length and the measured end-to-end dispersion,
wherein a fiber category and/or a specific fiber type of the optical fiber spans of said multi-span link is determined depending on the determined fiber dispersion profile.

The invention further provides according to a second aspect a determination apparatus for automatic determination of a fiber type of at least one optical fiber span used in a link of an optical network,
said determination apparatus comprising:
a measuring unit adapted to measure a length and a chromatic dispersion of said optical fiber span; and
a processing unit adapted to determine a fiber dispersion profile of said optical fiber span on the basis of the measured length and the measured chromatic dispersion of said optical fiber span and to determine a fiber category and/or a specific fiber type of said optical fiber span depending on the determined fiber dispersion profile.

The invention further provides according to a third aspect a network node of an optical network,
said network node comprising an apparatus for automatic determination of a fiber type of at least one optical fiber span used in a link of the optical network connecting said network node with another network node of the optical network, wherein the determination apparatus comprises:
a measuring unit adapted to measure a length and a chromatic dispersion of said optical fiber span; and
a processing unit adapted to determine a fiber dispersion profile of said optical fiber span on the basis of the measured length and the measured chromatic dispersion of said optical fiber span and further adapted to determine a fiber category and/or a specific fiber type of said optical fiber span depending on the determined fiber dispersion profile.

In a possible embodiment of the network node according to the third aspect of the present invention, the network node further comprises a configuration unit adapted to configure and/or reconfigure automatically at least one parameter of said network node on the basis of the determined fiber category and/or fiber type of said at least one optical fiber span of said link.

In a further possible embodiment of the network node according to the third aspect of the present invention, the network node further comprises a memory unit storing a look-up table wherein said processing unit of said network node is adapted to match the determined fiber dispersion profile with a fiber type entry of the look-up table to determine a fiber category and/or a specific fiber type of the optical fiber span of said link.

In a further possible embodiment of the network node according to the third aspect of the present invention, the configuration unit of said network node is adapted to configure and/or reconfigure an amplifier gain and/or an amplifier tilt setting of an amplifier of said network node.

The invention further provides according to a fourth aspect an optical network comprising
network nodes connected with each other through single- and/or multi-span links each including at least one optical fiber span,
wherein at least one network node of said optical network comprises a determination apparatus adapted to perform an automatic determination of a fiber category and/or a specific fiber type of at least one optical fiber span of an optical link used in the optical network,
said determination apparatus comprising:
a measuring unit adapted to measure a length and a chromatic dispersion of said optical fiber span; and
a processing unit adapted to determine a fiber dispersion profile of said optical fiber span on the basis of the measured length and the measured chromatic dispersion of said optical fiber span and further adapted to determine a fiber category and/or a specific fiber type of said optical fiber span depending on the determined fiber dispersion profile.

In a possible embodiment of the optical network according to the fourth aspect of the present invention, the optical network is a wavelength division multiplexed, WDM, optical network comprising a plurality of network nodes connected with each other via optical fiber spans each comprising at least one optical fiber adapted to transport an optical signal at one or at several signal wavelengths.

In a possible embodiment of the optical network according to the fourth aspect of the present invention, the optical network comprises a network fiber inventory record of a network provider updated automatically on the basis of the fiber categories and/or fiber types of the optical fiber spans as determined by the determination apparatuses of the network nodes of said optical network.

BRIEF DESCRIPTION OF FIGURES

In the following, technical details of different exemplary embodiments of the different aspects of the present invention are described with reference to the enclosed figures.

DETAILED DESCRIPTION OF EMBODIMENTS

Figure 1:
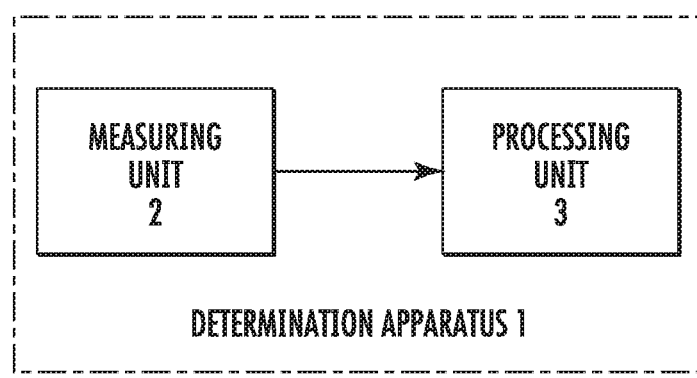
FIG. 1 illustrates a block diagram of a possible exemplary embodiment of a determination apparatus for automatic determination of a fiber type of an optical fiber span according to an aspect of the present invention.

The present invention provides according to a first aspect a method for automatic determination of a fiber type of an optical fiber span used in a link of an optical network. The optical network can comprise a plurality of network nodes connected with each other by means of optical fiber spans each comprising at least one optical fiber. Two network nodes of the optical network can be connected through a single- or a multi-optical span link. At least some of the network nodes of the optical network can comprise an integrated determination apparatus as illustrated in FIG. 1. The determination apparatus 1 as shown in FIG. 1 is adapted to perform an automatic determination of a fiber type of at least one optical fiber span used in a link of the optical network.

As can be seen in FIG. 1, the determination apparatus 1 can be formed by a circuit comprising a measuring unit 2 and a processing unit 3.

In the illustrated exemplary embodiment, the measuring unit 2 is adapted to measure a length L of an optical fiber span connected to the network node comprising the determination apparatus 1 as illustrated in FIG. 1. The measuring unit 2 is further adapted to measure a chromatic dispersion of the respective optical fiber span.

In a possible embodiment, the measuring unit 2 comprises a first measuring subunit adapted to measure the length L of the optical fiber span. The length L of an optical fiber span between adjacent network nodes can be estimated in different ways. In a possible implementation, the length L of the optical fiber span can be calculated using a measured latency and constant values for the speed of light c and the fiber refractive index n. The range of the refractive index variation is small across all commercial available fiber types. For instance, the refractive index variation is in a range between 1.46 and 1.47. This translates to variations well below the required length measurement accuracy. The fiber latency measurement accuracy within approximately 5 microseconds yields a fiber length estimate accuracy within approximately 1 km, which is sufficient for subsequent calculations. In a possible implementation of the latency measurement, the measurement can be performed by means of an optical supervisory channel OSC using overhead messaging (e.g., Ethernet, OTN) for timestamping and calculating a round-trip delay time. In an alternative embodiment for measuring the length of the optical fiber span, an OTDR device integrated in the network equipment is used. For instance, it is possible to use an optical supervisory channel OSC or a standalone OTDR device connected to a line equipment of the optical network with an optical switch.

The measuring unit 2 comprises in a further possible embodiment a measuring subunit adapted to measure a chromatic dispersion CD of the optical fiber span. The total chromatic dispersion (in units of ps/nm) generated by the optical fiber span can be measured for at least one wavelength $\lambda$ in a signal transmission band STB or for multiple wavelengths inside or outside the signal transmission band. The chromatic dispersion, CD, measurement accuracy does determine the likelihood of distinguishing between fiber types with small differences in the chromatic dispersion values. For example, a chromatic dispersion measurement accuracy of approximately 20 ps/nm enables the user to discern between two common fiber types (if the chromatic dispersion CD is measured at more than one wavelength), i.e. TW-RS and LEAF, which have relatively close chromatic dispersion values at a wavelength $\lambda$ of 1550 nm, but provide a different system performance. A chromatic dispersion measurement accuracy down to approximately 10 ps/nm or better can be achieved through common measurement techniques. A higher accuracy (i.e. lower value in ps/nm) is desirable since it provides the best estimate of the fiber type.

The chromatic dispersion CD of the optical fiber span can be measured in different ways. In a possible implementation, a modulation phase shift method is employed. The modulation phase shift method can be implemented with light sources integrated in the optical network system using an optical supervisory channel OSC. An alternative implementation can be based on low-speed coherent DSP devices, which can also be integrated within the equipment or network node of the optical network. In an alternative implementation, the end-to-end link chromatic dispersion is measured using a coherent Rx and DSP integrated within a transceiver of the network node. In this implementation, it is possible to measure the total fiber chromatic dispersion from the transceiver's Tx to Rx path, which can cover multiple optical fiber spans. In this implementation, the total dispersion profile for each optical fiber span can only be accurately determined if all optical fiber spans in the signal path comprise the same fiber type. If all fiber spans in a signal path are of the same fiber type the link forms a homogeneous optical fiber link within the network.

As shown in the embodiment illustrated in FIG. 1, the measuring unit 2 of the determination apparatus 1 is adapted to measure the length L and the chromatic dispersion CD of an optical fiber span used in the optical link OL of the optical network. The determination apparatus 1 as illustrated in FIG. 1 further comprises a processing unit 3. The processing unit 3 is adapted to determine a fiber dispersion profile FDP of the optical fiber span on the basis of the measured length L and on the basis of the measured chromatic dispersion CD of the optical fiber span provided by the measuring unit 2. The processing unit 3 is further adapted to determine a fiber category and/or a specific fiber type of the optical fiber span depending on the determined fiber dispersion profile FDP. Using the measured length L of the optical fiber span and using the measured chromatic dispersion CD of the optical fiber span the dispersion profile of the optical fiber span is determined by the processing unit 3. If only one dispersion measurement point is taken the fiber dispersion profile FDP comprises only a single dispersion coefficient (in ps/nm/km) at a given transmission signal wavelength $\lambda$. If multiple dispersion measurements are performed this does result in several dispersion coefficients at multiple wavelengths which can be translated in a dispersion slope. The processing unit 3 first determines the fiber dispersion profile FDP of the optical fiber span on the basis of the measured length L and the measured fiber chromatic dispersion CD of the optical fiber span and then determines a fiber category and a specific fiber type of the optical fiber span depending on the determined fiber dispersion profile FDP. In a possible embodiment, for each signal wavelength of a signal transmitted through the optical fiber span a dispersion coefficient is determined. If the fiber chromatic dispersion of the optical fiber span is measured by the measuring unit 2 for multiple signal wavelengths a corresponding number of dispersion coefficients is determined and the determined dispersion coefficients can be evaluated by the processing unit 3 to derive a chromatic dispersion slope of the optical fiber span. The fiber category and/or fiber type of the optical fiber span can be determined depending on the fiber dispersion profile FDP and the derived chromatic dispersion slope. A fiber category can comprise a group of different fiber types having similar characteristics. In a possible implementation, the fiber dispersion profile FDP determined by the processing unit 3 is matched to a fiber type entry of a look-up table LUT to determine a fiber category and/or a specific fiber type of the respective optical fiber span. With the measured length and fiber dispersion data the fiber dispersion profile FDP can be determined by the processing unit 3 for the respective optical fiber span. By evaluating the dispersion profile a fiber type of the optical fiber span can be derived using a look-up table LUT which can be stored in a memory of the determination apparatus 1. An exemplary potential implementation is shown in the following Table A.

TABLE A

| Fiber Type | Fiber Dispersion [ps/nm/km] | | | CD slope [ps/nm^2/km] |
|---|---|---|---|---|
| | @ 1530 nm | @ 1550 nm | @ 1565 nm | @ 1550 nm |
| SMF-28 | 15.6 ... 16.7 | 16.8 ... 17.9 | 17.7 ... 18.8 | ≤0.092 |
| TrueWave-REACH | 5.5 ... 7.3 | 6.4 ... 8.0 | 7.1 ... 8.9 | ≤0.045 |
| TrueWave-RS | 2.6 ... 4.25 | 3.6 ... 5.0 | 4.4 ... 6.0 | ≤0.05 |
| LEAF | 2.0 ... 5.5 | 3.8 ... 4.6 | 4.5 ... 6.0 | ≤0.092 |
| ... | ... | ... | ... | ... |

Each commercially deployed fiber type is associated with an allowable range of dispersion coefficient values at one or multiple wavelengths. Further, each commercially deployed fiber type can be associated with a dispersion slope at a given wavelength. The measured fiber dispersion profile FDP can be matched by the processing unit 3 to a fiber type entry from the illustrated look-up table LUT of Table A. If the measured data does not match any entry in the stored table, an error message can be generated by the determination apparatus 1 in a possible implementation to alert an operator of the network.

The optical link OL between two network nodes NN of the optical network can comprise a single-span optical link SS-OL or a multi-span optical link MS-OL. A single-span optical link SS-OL comprises a single optical fiber span connecting an optical network node of the optical network with an adjacent optical network node of the same optical network. If the optical link is a single-span optical link SS-OL a fiber category and/or a fiber type of the optical fiber span can be automatically determined by one of the two optical network nodes connected by said single-span optical link SS-OL.

The optical link OL of the optical network can also be a multi-span optical link MS-OL which comprises several optical fiber spans connecting two distant network nodes of the optical network via a signal path with each other. In this case, it is possible to measure an end-to-end length of the optical fiber spans forming the multi-span optical link MS-OL and to measure an end-to-end chromatic dispersion CD of the optical fiber spans forming the multi-span optical link MS-OL to determine a fiber dispersion profile of all optical fiber spans of the respective multi-span optical link MS-OL on the basis of the measured end-to-end length and the measured end-to-end chromatic dispersion. In this embodiment, the measuring unit 2 of the determination apparatus 1 measures an end-to-end length of the optical fiber spans of the multi-span optical link MS-OL and further measures an end-to-end chromatic dispersion of the optical fiber spans forming the multi-span optical link MS-OL. The processing unit 3 of the determination apparatus 1 is adapted to determine a fiber dispersion profile FDP of the optical fiber spans of the multi-span optical link MS-OL on the basis of the measured end-to-end length and on the basis of the measured end-to-end chromatic dispersion. The processing unit 3 is further adapted to determine a fiber category and/or a specific fiber type of the optical fiber spans of the multi-span optical link MS-OL depending on the determined fiber dispersion profile FDP.

In a further possible embodiment of the determination apparatus 1, a fiber category is estimated rather than determining a specific fiber type. A fiber category can be determined in a possible embodiment by measuring the total end-to-end chromatic dispersion CD of the optical fiber spans at a single wavelength λ and then using the measured end-to-end fiber length L to calculate an end-to-end dispersion coefficient.

Alternatively, the individually measured fiber lengths L of the different optical fiber spans forming the multi-span optical link MS-OL can be summed up to calculate the end-to-end fiber length. The following Table B illustrates an exemplary system.

TABLE B

| Fiber Category | CD Coefficient @1550 nm |
|---|---|
| High-Dispersion | >10 |
| Medium-Dispersion | 6 ... 10 |
| Low-Dispersion | 2 ... 6 |
| Near-Zero-Dispersion | −2 ... 2 |
| Negative-Dispersion | <−2 |

For example, two common fiber types, LEAF and TrueWave-RS, comprise a chromatic dispersion coefficient at a wavelength of 1550 nm of approximately 4 to 4.5 ps/nm. If the chromatic dispersion CD is measured only at a wavelength λ of 1550 nm then the two fiber types can be identified as belonging to the same low-dispersion fiber category, but cannot be distinguished from each other without measuring the chromatic dispersion CD for at least one other wavelength λ and using a more complex chromatic dispersion profile as given in the above Table A. However, in some cases or for some applications, determining only a general fiber category can be sufficient. This embodiment has the advantage that it requires less hardware and a simpler and faster calculation procedure.

In a further possible embodiment, first, a general fiber category is determined by the processing unit 3 of the determination apparatus 1 wherein the fiber category comprises a group of different fiber types having similar characteristics. In a further step, a specific fiber type within the fiber category is then determined by the processing unit 3 using additional measurement data. In a possible implementation, the fiber chromatic dispersion of the optical fiber span is first measured for a single signal wavelength λ of a signal transmitted through the optical fiber span to determine first the fiber category of the optical fiber span comprising a group of possible different fiber types. Then, the signal wavelength λ of the signal transmitted through the optical fiber span is changed and the fiber chromatic dispersion of the optical fiber span for the changed signal wavelength λ is measured to determine a specific fiber type within the previously determined fiber category.

In a possible embodiment, for each optical fiber span of the optical network, a fiber category and/or specific fiber type of the adjacent optical fiber span is determined by an adjacent network node. An alternative option is to determine the fiber category and/or fiber type end-to-end for a multi-span optical link MS-OL. First, a total end-to-end chromatic dispersion and length of the optical fiber spans forming the multi-span optical link MS-OL are measured and then a fiber dispersion profile FDP is calculated by the processing unit 3 for the end-to-end multi-span optical link instead for each individual optical fiber span. In this case, a simplifying assumption is made, i.e. that each optical fiber span in the end-to-end multi-span optical link MS-OL comprises the same optical fiber type. Although this is not always the case in optical systems, this assumption is acceptable for a coarse or less accurate estimate requiring less equipment. If the end points of the optical link have terminating signals with coherent receivers, the built-in DSP forming the processing unit 3 can provide an accurate estimate of the end-to-end chromatic dispersion. This can be used for such an end-to-end fiber type estimation.

The determination apparatus 1 illustrated in FIG. 1 can be implemented in an optical network node of an optical network. Further, the determination apparatus 1 can also form a separate entity within the optical network. The optical network can be a wavelength division multiplexed, WDM, optical network, in particular a DWDM optical network comprising a plurality of network nodes connected with each other via optical fiber spans each comprising at least one optical fiber adapted to transport an optical signal at one or several signal wavelengths.

In a possible embodiment, the determination apparatus 1 further comprises a configuration unit adapted to configure or reconfigure automatically at least one parameter of the network node on the basis of the determined fiber category and/or fiber type of the at least one optical fiber span of the respective optical link. In a possible embodiment, the determination apparatus 1 further comprises a memory unit storing a look-up table LUT wherein the processing unit 3 is adapted to match the determined fiber dispersion profile FDP with a fiber type entry of the stored look-up table LUT to determine a fiber category and/or a specific fiber type of the optical fiber span of said optical link. The configuration unit of the determination apparatus 1 which may be integrated in a network node of the optical network can be adapted to configure or reconfigure an amplifier gain and/or an amplifier tilt setting of an amplifier integrated in said network node. The determined fiber category and/or fiber type of the optical fiber span can be stored locally in a memory unit of the determination apparatus 1. The identified fiber category and/or fiber type of the optical fiber span can be notified to at least one other network node of the optical network and/or may be stored in a network fiber inventory record of the optical network. The network fiber inventory record can form a database of the optical network operator. The network fiber inventory record can be generated and updated on the basis of the determined fiber categories and/or fiber types of the different optical fiber spans provided in the respective optical network of the network operator. Accordingly, the determination apparatus 1 integrated in a network node of the optical network can comprise a communication interface for communicating the determined fiber categories and/or fiber types to a central network fiber inventory record of the respective optical network. Further, the determination apparatus 1 can also supply the determined fiber dispersion profile and/or derived chromatic dispersion slope of the optical fiber spans to the central network fiber inventory record of the optical network. The transmission of this information data comprising the determined fiber categories and/or fiber types and/or fiber dispersion profiles FDPs and/or derived chromatic dispersion slopes can be performed in-band in an embedded communication channel ECC or out-of-band in a separate communication channel such as an optical supervisory channel OSC.

Figure 2:
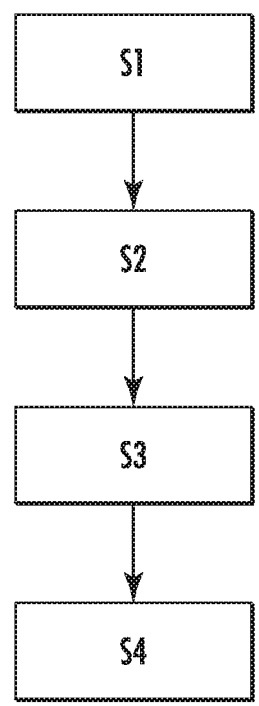
FIG. 2 shows a schematic flowchart of a possible exemplary embodiment of a method for automatic determination of a fiber type of an optical fiber span according to a further aspect of the present invention.

FIG. 2 shows a flowchart of a possible exemplary embodiment of a method for performing an automatic determination of a fiber type of at least one optical fiber span as used in an optical link of an optical network. In the illustrated exemplary embodiment, the method comprises several main steps. In a first step S1, a length L of the optical fiber span is measured. In a possible implementation, the fiber length can be calculated using a measured latency using constant values for the speed of light c and the fiber refractive index n of the fiber material used in the fibers of the at least one optical fiber span. Alternatively, the length L of the optical fiber span can be measured using a built-in OTDR device which can be integrated in the optical network equipment or optical network node.

In a further step S2, a chromatic dispersion CD of the optical fiber span is measured. The fiber chromatic dispersion of the optical fiber span can be measured in step S2 for at least one signal wavelength $\lambda$ of an optical signal transmitted through the optical fiber span within a predetermined signal transmission band STB. Alternatively, the fiber chromatic dispersion of the optical fiber span can be measured in step S2 for a multiple signal wavelength of signals transmitted through said optical fiber span inside or outside a predetermined signal transmission band. Accordingly, a total fiber dispersion in picoseconds/nm can be measured at one or preferably multiple signal wavelengths. In a possible embodiment, the first step S1 and the second step S2 can be performed by a measuring unit 2 of a determination apparatus 1 as illustrated in FIG. 1.

In a further step S3, a fiber dispersion profile FDP of the optical fiber span can be determined on the basis of the measured length and on the basis of the measured fiber chromatic dispersion.

Finally, in step S4, a fiber category and/or a specific fiber type of the optical fiber span is determined depending on the fiber dispersion profile FDP and can be stored and/or notified to another network node or controller.

In a possible implementation, the determination of the fiber dispersion profile FDP of the optical fiber span in step S3 and the determination of the fiber category and/or specific fiber type can in step S4 be performed by a processing unit 3 of a determination apparatus 1 as illustrated in FIG. 1.

With the method as illustrated in FIG. 2, for each signal wavelength a dispersion coefficient can be determined. If the fiber chromatic dispersion of the optical fiber span is measured for multiple signal wavelengths a corresponding number of dispersion coefficients is determined and the determined dispersion coefficients are evaluated to derive a chromatic dispersion slope of the optical fiber span in step S3. Further, a fiber category and/or fiber type of the optical fiber span can then be determined in step S4 depending not only on the fiber dispersion profile FDP but also on the chromatic dispersion slope derived in step S3. In a possible implementation, the fiber dispersion profile FDP of the optical fiber span determined in step S3 can be matched to a fiber type entry of a look-up table LUT in step S4 to determine the fiber category and/or specific fiber type of the optical fiber span.

After a fiber category and/or a specific fiber type of the optical fiber span has been determined in step S4, a parameter setting of at least one parameter of the respective network node can be calculated depending on the determined fiber category and/or fiber type and can be applied to optimize a transmission performance of the respective optical network.

These parameters can comprise in a possible implementation an amplifier gain of an amplifier of the network node and/or a tilt compensation for a fiber attenuation tilt and/or stimulated Raman scattering induced tilt.

Figure 3:
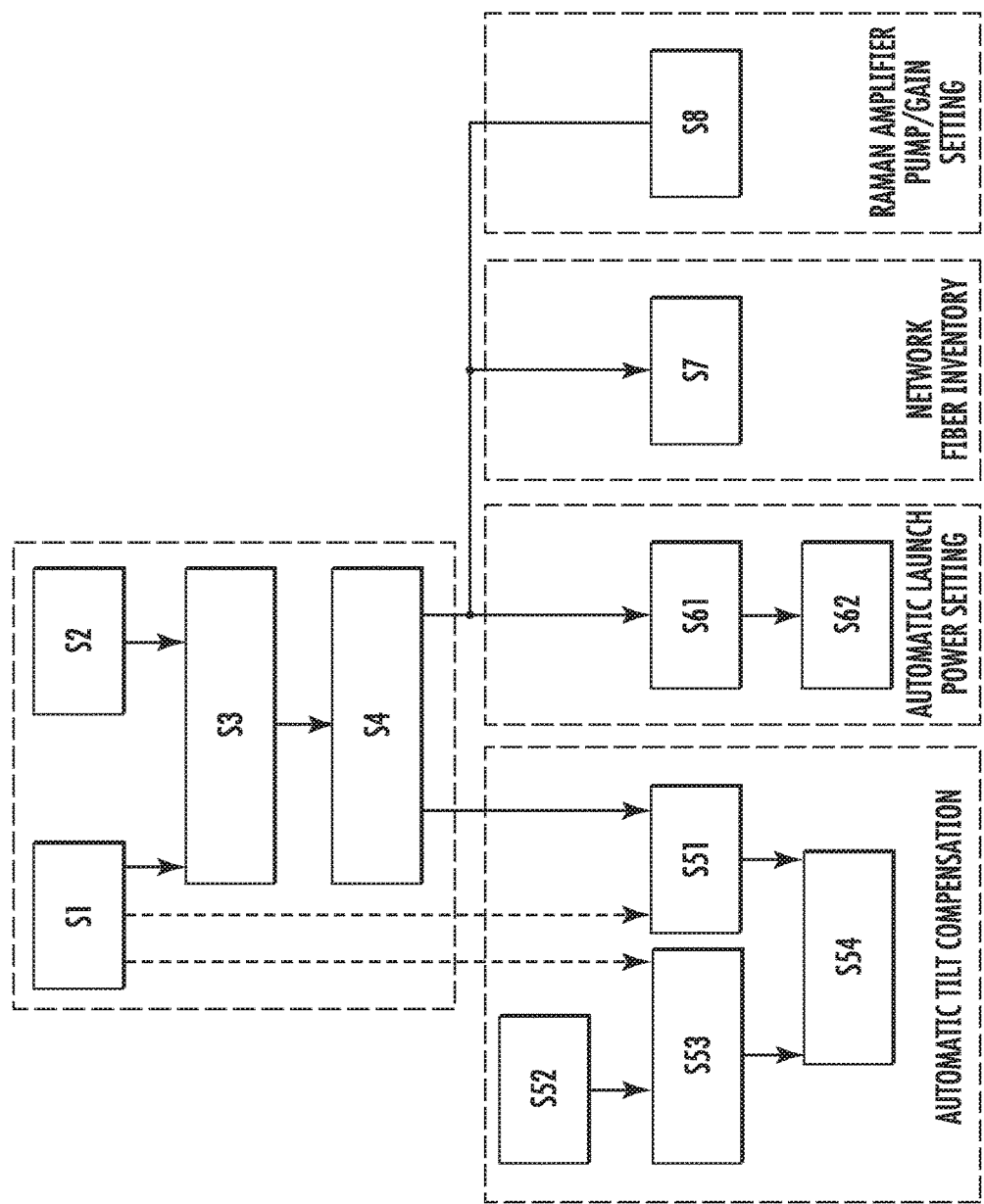
FIG. 3 shows a flowchart of a possible exemplary embodiment of a method for automatic determination of a fiber type of an optical fiber span according to the present invention.

Once a fiber type of the optical fiber span has been determined in step S4 according to the procedure illustrated in FIG. 2, the resulting information can be used for different purposes as illustrated in the diagram of FIG. 3. As illustrated in FIG. 3, the information can be used for automatic tilt compensation, automatic launch power settings and/or Raman pump gain settings. Further, the information can be used for updating the central network fiber inventory of the optical network.

Once the network fiber type has been determined in step S4, an optical layer equipment or optical network node including amplifiers and for instance ROADMs can then configure or reconfigure several key equipment settings to optimize the performance of the optical network. As an illustrative example, settings of an amplifier in the optical link OL can be automatically set using the fiber type information provided by the method as illustrated in FIG. 2. An optical network node of the optical network can comprise an integrated signal amplifier. After having determined the specific network fiber type of the adjacent optical fiber span, the processing unit 3 of a determination apparatus 1 integrated in an optical network node can determine gain and/or tilt settings for an integrated amplifier to optimize the performance of the optical network.

An automatic tilt compensation procedure can be performed in step S5 as illustrated in the schematic diagram of FIG. 3. The automatic tilt compensation procedure relies on the detected fiber type determined in step S4. As shown in FIG. 3, the automatic total tilt compensation is based on the detected fiber type of the at least one optical fiber span and comprises several substeps. In a step S51, an expected fiber attenuation tilt can be calculated. The expected fiber attenuation tilt can be calculated based on a fiber length and based on a fiber attenuation slope according to the determined fiber type of the optical fiber span. The fiber length has been measured in step S1. The fiber dispersion slope can be derived from the fiber chromatic dispersion coefficients calculated in step S3. In a possible implementation, the fiber attenuation tilt is calculated in step S51 according to the following equation:

Fiber attenuation tilt[dB]=fiber length[km]*fiber attenuation slope[dB/km]

The fiber attenuation slope within the transmission band (in units of dB/km) can be determined from a look-up table based on the previously determined fiber type.

Further, as illustrated in FIG. 3, for performing the automatic tilt compensation a total fiber input power is measured in step S52. In the substep S52, the total power launched into the optical network fiber can be measured. This can be for instance performed by monitoring a photodiode PD at the EDFA fiber output. Then, in substep S53, an expected stimulated Raman scattering, SRS-induced tilt can be calculated. Based on the fiber input power, fiber Raman gain efficiency, a system bandwidth and based on an effective fiber length, an expected SRS-induced tilt can be calculated. The fiber Raman gain efficiency is based on the fiber type determined in step S4. The system bandwidth can comprise a fixed amplifier characteristic. Further, the fiber effective length can be pre-defined or calculated.

In a possible embodiment, the expected Raman tilt can be calculated according to the following equation:

Raman tilt[db]=$OPT*B_{WDM}*L_{eff}*A*C_R$, wherein OPT is the measured total launch power into the optical network fiber,
$B_{WDM}$ is the total WDM system bandwidth of a WDM optical network,
$L_{eff}$ is the fiber effective length,
A is a constant and
$C_R$ is the Raman gain efficiency.

The measured total launch power into the optical network fiber OPT comprises a value which is typically measured by a photodiode PD monitoring the amplifier output power.

The total WDM system bandwidth $B_{WDM}$ is the available system bandwidth or the spectral width between the minimum and maximum possible wavelength channels.

The total WDM system bandwidth $B_{WDM}$ is an equipment limit associated with the amplifier hardware and can be stored in a memory. For a conventional C-band DWDM optical system, the total WDM system bandwidth $B_{WDM}$ can be approximately 4 to 5 THz comprising for instance 80 to 100 channels on a 50 GHz grid.

The fiber effective length $L_{eff}$ depends primarily on the fiber attenuation coefficient and on the fiber length for short optical fiber spans comprising a distance of less than approximately 50 km. A pre-defined constant value can be used for the fiber effective length $L_{eff}$ which can be based on a typical fiber loss having only a very small impact on the tilt calculation accuracy in most cases. For a higher accuracy, the fiber effective length $L_{eff}$ can be calculated based on the measured fiber length and based on a typical fiber loss coefficient depending on the specific fiber type determined from the look-up table LUT in step S4. For best accuracy, the fiber effective length $L_{eff}$ can also be calculated in a possible embodiment based on a measured fiber attenuation and measured length. This can be achieved if a OTDR function is built into the optical system.

The Raman tilt is calculated according to the above equation using a constant A. Further, the Raman gain efficiency $C_R$ can be determined from a look-up table LUT based on the previously determined fiber type.

After having calculated the expected stimulated Raman scattering, SRS, induced tilt in step S53 and having calculated the expected fiber attenuation tilt in step S51, a tilt compensation can be applied in step S54. Once the total tilt due to fiber attenuation and stimulated Raman scattering, SRS, is estimated a tilt compensation is applied in step S54 to compensate for the expected total tilt. This compensation can be accomplished by adjusting the amplifier tilt settings. Alternatively, the compensation can be achieved by adjusting per-channel attenuation levels using a wavelength-selective switch WSS or using a dynamic gain equalizer. In a possible embodiment, a full tilt compensation amount can be applied to a single amplifier. Alternatively, the tilt compensation amount can be divided between multiple amplifiers. These amplifiers can comprise a device at the near and at the far end of the optical fiber span. In a possible specific implementation, a communication via an optical supervisory channel OSC can be provided to share information for performing the tilt calculation and for performing the division of the tilt compensation between different amplifiers at the near or far end of the optical fiber span.

Figure 4:
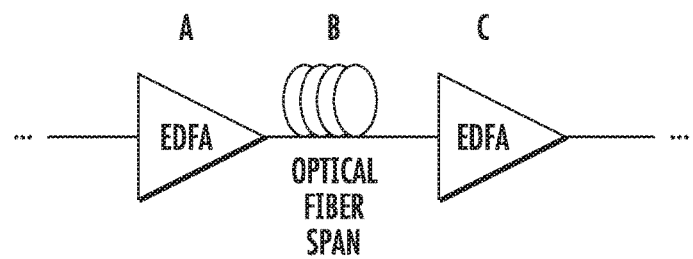
FIGS. 4, 5 show schematically an optical fiber span within an optical network for illustrating the operation of a method and apparatus according to the present invention.

FIG. 4 illustrates an exemplary optical link OL comprising an optical fiber span. In the illustrated embodiment, a signal amplifier EDFA A is connected via an optical fiber span B to a signal amplifier EDFA-C. The total tilt compensation for optical fiber span B can be applied in a possible embodiment to a single amplifier, for instance to the first optical amplifier EDFA. For example, the first optical amplifier EDFA applies the tilt compensation for the total estimated tilt generated on optical fiber span B. Alternatively, the total tilt compensation for optical fiber span B can be split between multiple amplifiers. For example, the Raman tilt generated on optical fiber span B can be compensated by the first optical amplifier EDFA and the fiber loss tilt generated by the optical fiber span B can be compensated by the other optical amplifier EDFA C on the receiving side.

FIG. 3 illustrates an automatic total tilt compensation based on the detected fiber type comprising a step S5 having substeps S51 to S54. Further, an automatic launch power setting can be performed on the basis of the determined fiber type in step S6. The automatic launch power setting can comprise two main substeps S61 and S62. In substep S61, an optimum fiber input power can be calculated based on the fiber type determined in step S4 to ensure acceptable impairments from a fiber nonlinearity. In a further substep S62, the amplifier gain and/or output power can be set to obtain a desired fiber input power. The gain for each amplifier can also be set based on a detected network fiber type to achieve a desired total launch power or a launch power per channel into the optical fiber to mitigate fiber nonlinear effects which may vary with different fiber types.

Figure 5:
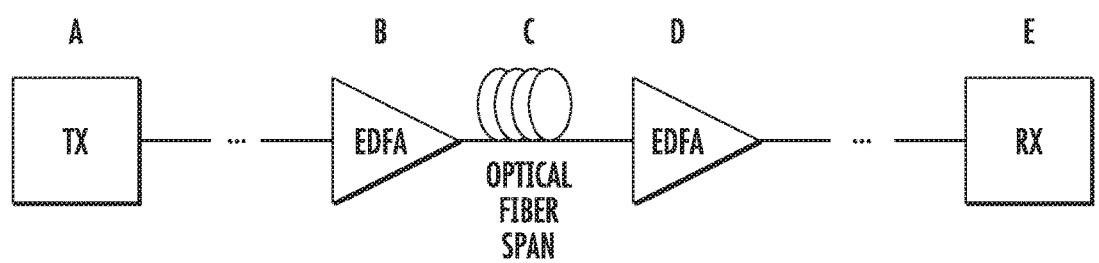

FIG. 5 illustrates an exemplary optical link OL as used in the optical network. The optical link or optical line can include optical fiber spans, amplifiers, and potentially other optical equipment devices such as ROADMs (not shown). The link endpoints of the optical link can include one or more transceivers. The optical link endpoints typically comprise multiple transceivers operating at multiple wavelengths which can be multiplexed together to create a WDM optical system comprising multiplexing/demultiplexing equipment (not shown in the simple illustration of FIG. 5). A fiber type for each optical span is automatically determined in step S4 and can then be used by the adjacent amplifiers to set an amplifier gain and/or to set a tilt compensation to optimize a transmission performance of the optical network. In the illustrated example of FIG. 5, the fiber type for optical fiber span C can be automatically detected using the above described method as shown in FIG. 2. After the optical fiber type of the optical fiber span C has been determined in step S4, the information is used by optical amplifier B and/or optical amplifier D to automatically configure or reconfigure parameter settings including an amplifier gain and/or a tilt compensation. An advantage of this is that the optical line equipment, i.e. the optical amplifiers and/or ROADMs, do not require knowledge of or interaction with the terminal equipment, i.e. transceivers, in order to detect the fiber type and to optimize parameter settings such as amplifier gain or tilt compensation. This allows for an automatically configuring, reconfiguring of the autonomous optical line system which can interoperate and can provide a better performance for a terminal equipment from multiple different vendors.

The automatic amplifier gain setting can be based on the fiber type detected in step S4. First, a target fiber input power can be determined. Based on the detected fiber type, the target fiber input power can be determined in step S61 in order to effectively control the impact of fiber nonlinear effects which varies with the fiber type and fiber input power. The target fiber input power can be determined in different ways depending on the amount of other system information available as well as available knowledge about the terminal equipment. Default values for each fiber type can be stored for each signal amplifier of the system. If more information sharing or data exchange is available between different system equipment components and/or network nodes then a more complex communication procedure can be implemented based on various parameters including transceiver type, number of WDM channels and path length, i.e. number of optical fiber spans. The target fiber input power can be approximated in a possible embodiment by the output power of the signal amplifier which immediately precedes the given optical fiber span.

Further, in step S62, the amplifier gain of the signal amplifier can be set to achieve a desired output power. Once the target launch power has been determined based on the detected fiber type, each signal amplifier can then automatically set its own amplifier gain to achieve the desired output power. A specific algorithm to implement this automatic gain setting may vary depending how much additional system information is available from other network nodes of the optical link OL. Additionally, a signal amplifier may have an output variable optical attenuator VOA following the gain stage. The variable optical attenuator VOA can be adjusted to reduce the total output power if desired or if necessary. The gain setting algorithm may also involve setting the output variable optical attenuator VOA to achieve the desired output signal power.

As illustrated in FIG. 3, the optical fiber type determined in step S4 can also be used for the optical network fiber inventory. As illustrated in FIG. 3, an accurate network fiber inventory record can be generated and updated in step S7 using the fiber types as determined as different optical network nodes or optical equipment devices in step S4 and notified to a central network fiber inventory node of the optical network through a communication channel. The generated accurate network fiber inventory record can be compared with existing records to validate the accuracy of the existing records. The determined optical fiber types and/or fiber categories as well as the measured fiber length and measured fiber dispersion can be communicated and stored in the network fiber inventory of the network operator. Once a fiber type is known the network operator has also the ability to perform simulations and/or analyses, for instance to determine a future update scenario of the optical network. For example, the network operator can analyze options for increasing a transmission capacity on a given optical link and/or the feasibility of adding add/drop optical nodes and/or extending a current optical link OL to longer distances.

Further, as illustrated in FIG. 3 appropriate Raman pump settings can be determined in step S8 based on network fiber Raman gain coefficients according to the determined fiber type. The determined fiber type of the optical fiber span can be used by a distributed Raman amplifier for determining appropriate Raman pump power settings to adjust the corresponding desired Raman gain amplifier.

The method as illustrated in FIGS. 2, 3 and the determination apparatus 1 as illustrated in FIG. 1 allow for automatic determination of a fiber type fiber span in the optical network. The determined optical fiber type in turn allows to automatically and accurately configure an optical layer equipment including signal amplifiers and ROADMs. The method for automatic detection of the fiber type and/or fiber category is based on measuring the fiber length in step S1 and measuring the chromatic fiber dispersion in step S2 to accurately discriminate between different fiber types. The method according to the first aspect of the present invention is fully automatic requiring no user input or prior knowledge about the transmission fibers employed by the optical fiber span. The method can be implemented with hardware and/or software components integrated in an optical transmission equipment. The method does not require any external test equipment or detailed spectral measurements. The output, i.e. the determined fiber type and/or fiber category of the fiber type provided by the determination method according to the present invention has many practical applications for automation and optimization in optical networks. The determined fiber type and fiber length information can be used to automatically compensate for a spectral tilt generated by transmission of WDM signals through optical fibers. The spectral tilt is caused by two different physical effects, i.e. a fiber attenuation, and by stimulated Raman scattering causing a Raman tilt. The determined fiber type can also be used to automatically set a gain or output power of a signal amplifier in the optical network. The gain or output power of the signal amplifier can be set based on the optimum launch power level into each optical fiber span which mitigates impairments from fiber nonlinear effects. The determined fiber type can also be used by a distributed Raman amplifier for determining appropriate Raman pump power settings to set the corresponding desired Raman amplifier gain. Further, the determined fiber type and measured fiber length and/or fiber dispersion can be notified and stored in a network fiber inventory which can in turn be used for validation of expected network fiber characteristics. Detailed and accurate knowledge of the optical network fiber types is beneficial in optimizing the optical transmission system. Several equipment settings are dependent on the network fiber type including compensation of spectral tilt due to both fiber attenuation and stimulated Raman scattering as well as optimum fiber input power (limited by fiber nonlinear effects). Although general assumptions can be made for the most common optical fiber types such assumptions can result in large errors and inaccuracies in optimizing the optical system. These errors and inaccuracies are overcome by the method and apparatus according to the present invention. Even in case that a detailed inventory record of the network fibers does exist, this inventory must be loaded in advance.

This loading can be performed locally for each node or into some centralized controller which communicates with each network node. The ability to automatically and accurately detect the fiber type of an optical fiber span in the existing optical network and to infer certain characteristics on this determined fiber type as provided by the method and apparatus according to the present invention is thus highly useful and allows the transmission equipment to automatically and autonomously configure and/or reconfigure many settings without any user intervention and without any centralized or local control.

The benefit of an accurate fiber type identification as performed by the method and apparatus according to the present invention can be highlighted with the following example. For a single 120 km optical fiber span, the difference in fiber attenuation tilt between a fiber comprising the fiber type SMF-28 and comprising the fiber type LEAF is about approximately 0.3 dB. While this fiber attenuation does not seem at first glance like a large amount, several cascaded optical fiber spans can add up to an uncompensated tilt of more than 1 dB if the fiber type is not correctly identified for tilt estimation and tilt compensation. The same concept applies to SRS-induced tilt where the differences between fibers of different fiber types can be even larger. A typical fully loaded DWDM system has approximately 20 dBm total power launched into the optical network fiber. Comparing SMF-28 and TrueWave-RS which form two commonly deployed fiber types in this fully-loaded condition, the difference in Raman tilt is about 0.7 for a single optical fiber span in this scenario. This does also add up to a much larger uncompensated tilt of several dB over multiple cascaded optical fiber spans. However, if the fiber type of the optical fiber span is accurately identified using a method and apparatus according to the present invention, a better tilt estimation can be provided and the total amount of uncompensated tilt will remain small, even after several cascaded optical fiber spans of the optical link OL. This improves performance by achieving more uniformity across all channels in the optical system and further reduces the requirements for channel power equalization by ROADMs.

The method according to the present invention provides an automatic detection of the network fiber type and is based on measuring the fiber length and fiber dispersion profile FDP and then using in a possible embodiment a look-up table LUT to determine the fiber category and/or specific fiber type of the optical fiber span. It can be performed fully automated in real time and carried out by an optical line equipment, in particular optical network nodes with no user input or external test equipment required. Thus, each individual network node in the optical network can independently and automatically determine the fiber type of the adjacent network fiber.

The resulting fiber type determined at each network node can be used for several purposes with the optical line equipment, in particular for further network optimization and network automatization. This eliminates the need for any user input or intervention to determine the network fiber type without sacrificing accuracy. The method and apparatus according to the present can be implemented in hardware and/or software components which can be included inside amplifier cards in a standard optical line system eliminating the need for any external test equipment. Further, each network node in the optical system can determine a local network fiber type automatically and autonomously without the need for network-level intervention. This is particularly advantageous in an optical system based on SDN or an open line system. With the automated fiber detection scheme according to the present invention the optical line equipment, e.g. the amplifiers and ROADMs, can perform a self-configuration and/or a self-reconfiguration to optimize a transmission performance of the optical system even for third-party transceivers transmitting signals transported over the optical line system of an optical network.

The invention claimed is:

1. A method for automatic determination of a fiber type of at least one optical fiber span used in a link of an optical network, the method comprising the steps of:
   measuring a length of said optical fiber span;
   measuring a fiber chromatic dispersion of said optical fiber span;
   determining a fiber dispersion profile of said optical fiber span on the basis of the measured length and the measured fiber chromatic dispersion; and
   determining a fiber category and/or a specific fiber type of said optical fiber span depending on the determined fiber dispersion profile,
   wherein the fiber chromatic dispersion of said optical fiber span is measured for at least one signal wavelength of a signal transmitted through said optical fiber span within a predetermined signal transmission band or for multiple signal wavelengths of signals transmitted through said optical fiber span inside or outside a predetermined signal transmission band.

2. The method according to claim 1 wherein for each signal wavelength a dispersion coefficient is determined on the basis of the measured fiber length and the measured chromatic dispersion of said optical fiber span.

3. The method according to claim 2 wherein when the fiber chromatic dispersion of said optical fiber span is measured for multiple signal wavelengths, a corresponding number of dispersion coefficients is determined and the determined dispersion coefficients are evaluated to derive a chromatic dispersion slope of said optical fiber span.

4. The method according to claim 3 wherein the fiber category and/or fiber type of said optical fiber span is determined depending on the fiber dispersion profile and/or the derived chromatic dispersion slope.

5. The method according to claim 1 wherein the fiber dispersion profile is matched to a fiber type entry of a look-up table to determine the fiber category and/or the specific fiber type of said optical fiber span.

6. The method according to claim 1 wherein the fiber chromatic dispersion of said optical fiber span is measured for a single signal wavelength of a signal transmitted through said optical fiber span to determine the fiber category comprising a group of different fiber types.

7. The method according to claim 6 wherein the signal wavelength of the signal transmitted through said optical fiber span is changed and the fiber chromatic dispersion of said optical fiber span for the changed signal wavelength is measured to determine the specific fiber type within the determined fiber category.

8. A method for automatic determination of a fiber type of at least one optical fiber span used in a link of an optical network, the method comprising the steps of:
measuring a length of said optical fiber span;
measuring a fiber chromatic dispersion of said optical fiber span;
determining a fiber dispersion profile of said optical fiber span on the basis of the measured length and the measured fiber chromatic dispersion; and
determining a fiber category and/or a specific fiber type of said optical fiber span depending on the determined fiber dispersion profile,
wherein the link is a single-span optical link or a multi-span optical link,
wherein the single-span optical link comprises a single optical fiber span connecting a network node of said optical network with an adjacent network node of said optical network, and
wherein the fiber category and/or the fiber type of the optical fiber span of said single-span optical link is automatically determined by the respective network node of said optical network.

9. The method according to claim 8 wherein at least one parameter of the network node of said optical network being connected via the optical fiber span of said optical link to the adjacent network node of said optical network is automatically configured or reconfigured on the basis of the determined fiber category and/or fiber type of the respective optical fiber span.

10. The method according to claim 9 wherein a parameter setting of the at least one parameter of said network node is calculated depending on the determined fiber category and/ or fiber type of the respective optical fiber span and applied to optimize a transmission performance of said optical network.

11. The method according to claim 10 wherein the parameter comprises an amplifier gain of an amplifier of said network node,
a tilt compensation for fiber attenuation tilt and/or stimulated Raman scattering, SRS, induced tilt.

12. The method according to claim 8 wherein a network fiber inventory record of the optical network is generated and updated on the basis of the determined fiber categories and/or fiber types of the optical fiber spans provided in said optical network.

13. A method for automatic determination of a fiber type of at least one optical fiber span used in a link of an optical network, the method comprising the steps of:
measuring a length of said optical fiber span;
measuring a fiber chromatic dispersion of said optical fiber span;
determining a fiber dispersion profile of said optical fiber span on the basis of the measured length and the measured fiber chromatic dispersion; and
determining a fiber category and/or a specific fiber type of said optical fiber span depending on the determined fiber dispersion profile,
wherein the link of the optical network is a multi-span optical link which comprises several optical fiber spans forming a signal path connecting two terminal network nodes of said optical network,
wherein an end-to-end length and an end-to-end dispersion of the optical fiber spans of said multi-span optical link is measured to determine the fiber dispersion profile of the optical fiber spans of said multi-span optical link on the basis of the measured end-to-end length and the measured end-to-end dispersion, and
wherein the fiber category and/or the specific fiber type of the optical fiber spans of said multi-span optical link is determined depending on the determined fiber dispersion profile.

14. A determination apparatus for automatic determination of a fiber type of at least one optical fiber span used in a link of an optical network, said determination apparatus comprising:
a measuring circuit being adapted to measure a length and a fiber chromatic dispersion of said optical fiber span;
a processing circuit being adapted to determine a fiber dispersion profile of said optical fiber span on the basis of the measured length and measured chromatic dispersion of said optical fiber span and to determine a fiber category and/or a specific fiber type of said optical fiber span depending on the determined fiber dispersion profile; and
the measuring circuit is further adapted to measure the fiber chromatic dispersion of said optical fiber span for at least one signal wavelength of a signal transmitted through said optical fiber span within a predetermined signal transmission band or for multiple signal wavelengths of signals transmitted through said optical fiber span inside or outside a predetermined signal transmission band.

15. A network node of an optical network, said network node comprising the determination apparatus according to claim 14 for automatic determination of the fiber type of the at least one optical fiber span used in the link of the optical network connecting said network node with another network node of the optical network.

16. The network node according to claim 15 further comprising at least one optical amplifier adapted to configure or reconfigure automatically at least one parameter of said network node on the basis of the determined fiber category and/or fiber type of said at least one optical fiber span of said link.

17. The network node according to claim 16 wherein the at least one optical amplifier of said network node is adapted to configure or reconfigure an amplifier gain and/or an amplifier tilt setting of an amplifier of said network node.

18. The network node according to claim 15 further comprising a memory storing a look-up table wherein said processing circuit is adapted to match the determined fiber dispersion profile with a fiber type entry of the look-up table to determine the fiber category and/or the specific fiber type of the optical fiber span of said link.

19. An optical network comprising network nodes connected with each other through single- and/or multi-span optical links each including at least one optical fiber span, wherein at least one network node of said optical network comprises the determination apparatus according to claim 14 adapted to perform the automatic determination of the fiber category and/or the specific fiber type of the at least one optical fiber span of the link used in the optical network.

20. The optical network according to claim 19 wherein the optical network is a wavelength division multiplexed, WDM, optical network comprising a plurality of network nodes connected with each other via optical fiber spans each comprising at least one optical fiber adapted to transport an optical signal at one or at several signal wavelengths.

21. The optical network according to claim 19 wherein the optical network further comprises a network fiber inventory of a network provider updated automatically on the basis of the fiber categories and/or fiber types of the optical fiber spans determined by the determination apparatuses of the network nodes within said optical network.

22. A determination apparatus for automatic determination of a fiber type of at least one optical fiber span used in a link of an optical network, said determination apparatus comprising:
 a measuring circuit being adapted to measure a length and a fiber chromatic dispersion of said optical fiber span;
 a processing circuit being adapted to determine a fiber dispersion profile of said optical fiber span on the basis of the measured length and measured chromatic dispersion of said optical fiber span and to determine a fiber category and/or a specific fiber type of said optical fiber span depending on the determined fiber dispersion profile;
 wherein the link is a single-span optical link or a multi-span optical link;
 wherein the single-span optical link comprises a single optical fiber span connecting a network node of said optical network with an adjacent network node of said optical network; and
 the processing circuit is adapted to automatically determine the fiber category and/or the fiber type of the optical fiber span of said single-span optical link by the respective network node of said optical network.

23. A determination apparatus for automatic determination of a fiber type of at least one optical fiber span used in a link of an optical network, said determination apparatus comprising:
 a measuring circuit being adapted to measure a length and a fiber chromatic dispersion of said optical fiber span; and
 a processing circuit being adapted to determine a fiber dispersion profile of said optical fiber span on the basis of the measured length and measured chromatic dispersion of said optical fiber span and to determine a fiber category and/or a specific fiber type of said optical fiber span depending on the determined fiber dispersion profile;
 wherein the link of the optical network is a multi-span optical link which comprises several optical fiber spans forming a signal path connecting two terminal network nodes of said optical network;
 wherein the measuring circuit measures an end-to-end length and an end-to-end dispersion of the optical fiber spans of said multi-span optical link;
 the processing circuit is adapted to determine the fiber dispersion profile of the optical fiber spans of said multi-span optical link on the basis of the measured end-to-end length and the measured end-to-end dispersion; and
 wherein the fiber category and/or the specific fiber type of the optical fiber spans of said multi-span optical link is determined depending on the determined fiber dispersion profile.

* * * * *